US012389251B2

(12) United States Patent
Taherzadeh Boroujeni et al.

(10) Patent No.: US 12,389,251 B2
(45) Date of Patent: *Aug. 12, 2025

(54) MULTI-BEAM PHYSICAL DOWNLINK CONTROL CHANNEL (PDCCH) VIA MONITORING AGGREGATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Juan Montojo, San Diego, CA (US); Iyab Issam Sakhnini, San Diego, CA (US); Jelena Damnjanovic, Del Mar, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 18/458,675

(22) Filed: Aug. 30, 2023

(65) Prior Publication Data

US 2024/0064543 A1 Feb. 22, 2024

Related U.S. Application Data

(63) Continuation of application No. 17/343,237, filed on Jun. 9, 2021, now Pat. No. 11,778,494.

(Continued)

(51) Int. Cl.
*H04W 4/00* (2018.01)
*H04W 24/08* (2009.01)
(Continued)

(52) U.S. Cl.
CPC ......... *H04W 24/08* (2013.01); *H04W 72/046* (2013.01); *H04W 72/23* (2023.01); *H04W 80/02* (2013.01)

(58) Field of Classification Search
CPC ... H04W 24/08; H04W 72/046; H04W 72/23; H04W 80/02; H04L 5/0053; H04L 5/0023; H04L 5/0091
See application file for complete search history.

(56) References Cited

U.S. PATENT DOCUMENTS 11,277,301 B2 *  3/2022  Zhou ..................... H04W 24/02
11,611,468 B2 *  3/2023  Zhou ..................... H04W 76/19
(Continued)

FOREIGN PATENT DOCUMENTS

WO  WO-2018232199 A1     12/2018
WO  WO-2020228950 A1 *   11/2020  ........... H04L 5/0044
(Continued)

OTHER PUBLICATIONS

Huawei, et al., "Multi-Beam Transmission for DL Control Channel", 3GPP Draft, 3GPP TSG RAN WG1 Meeting #91, R1-1719811, 3rd Generation Partnership Project (3GPP), Mobile Competence Centre, 650, Route Des Lucioles, F-06921 Sophia-Anti Polis Cedex, France, vol. RAN WG1, No. Reno, USA; Nov. 27, 2017-Dec. 1, 2017, Nov. 17, 2017 (Nov. 17, 2017), 4 Pages, XP051369189, sections 1-4.

(Continued)

*Primary Examiner* — Thai Dinh Hoang
(74) *Attorney, Agent, or Firm* — Patterson & Sheridan, LLP

(57) ABSTRACT

Certain aspects of the subject matter described in this disclosure can be implemented in a method for wireless communication by a user equipment (UE). The method generally includes monitoring for a physical downlink control channel (PDCCH) in each of a plurality of monitoring occasions in a search space, wherein the PDCCHs are associated with the same downlink control information (DCI), and wherein the plurality of monitoring occasions are (Continued)

monitored using different beams; and decoding the PDCCHs after the monitoring.

28 Claims, 9 Drawing Sheets

Related U.S. Application Data

(60) Provisional application No. 63/038,437, filed on Jun. 12, 2020.

(51) Int. Cl.
*H04W 72/044* (2023.01)
*H04W 72/23* (2023.01)
*H04W 80/02* (2009.01)

(56) References Cited

U.S. PATENT DOCUMENTS

| | | | |
|---|---|---|---|
| 2020/0196346 A1* | 6/2020 | Khoshnevisan | H04W 72/23 |
| 2020/0213978 A1* | 7/2020 | Iyer | H04L 1/1812 |
| 2021/0392527 A1 | 12/2021 | Taherzadeh Boroujeni et al. | |
| 2022/0322413 A1* | 10/2022 | Kyung | H04W 72/23 |

FOREIGN PATENT DOCUMENTS

| | | | | |
|---|---|---|---|---|
| WO | WO-2021252711 A1 * | 12/2021 | ........... | H04L 5/0023 |
| WO | WO-2022205004 A1 * | 10/2022 | ........... | H04B 7/0695 |

OTHER PUBLICATIONS

Intel Corporation: "Multi-Beam Operation for NR PDCCH", 3GPP Draft, 3GPP TSG RAN WG1 Meeting #90, R1-1712570 Intel PDCCH Multi-Beam, 3rd Generation Partnership Project (3GPP), Mobile Competence Centre, 650, Route Des Lucioles, F-06921, Sophia-Antipolis Cedex, France, vol. RAN WG1, No. Prague, P. R. Czechia, Aug. 21, 2017-Aug. 25, 2017, Aug. 20, 2017 (Aug. 20, 2017), XP051315386, 3 pages, sections 1-3.

Interdigital Inc: "On Beam Indication for PDCCH and PDSCH", 3GPP Draft, 3GPP TSG RAN WG1 Meeting #90, R1-1714141, On Beam Indication for PDCCH and PDSCH, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 21, 2017-Aug. 25, 2017, Aug. 20, 2017 (Aug. 20, 2017), XP051316930, 4 pages, sections 1-3.

International Preliminary Report on Patentability—PCT/US2021/036723, The International Bureau of WIPO—Geneva, Switzerland, Dec. 22, 2022.

International Search Report and Written Opinion—PCT/US2021/036723—ISA/EPO—Oct. 4, 2021.

* cited by examiner

400

402

GENERATING, BY A BASE STATION (BS), A PHYSICAL DOWNLINK CONTROL CHANNEL (PDCCH) IN EACH OF A PLURALITY OF MONITORING OCCASIONS IN A SEARCH SPACE, WHEREIN THE PDCCHs ARE ASSOCIATED WITH THE SAME DOWNLINK CONTROL INFORMATION (DCI), AND WHEREIN THE PDCCHs IN THE PLURALITY OF MONITORING OCCASIONS ARE TRANSMITTED USING DIFFERENT BEAMS

404

TRANSMITTING, BY THE BS, THE PDCCHs

MONITORING, BY A USER EQUIPMENT (UE), FOR A PHYSICAL DOWNLINK CONTROL CHANNEL (PDCCH) IN EACH OF A PLURALITY OF MONITORING OCCASIONS IN A SEARCH SPACE, WHEREIN THE PDCCHs ARE ASSOCIATED WITH THE SAME DOWNLINK CONTROL INFORMATION (DCI), AND WHEREIN THE PLURALITY OF MONITORING OCCASIONS ARE MONITORED USING DIFFERENT BEAMS

504

DECODING, BY THE UE, THE PDCCHs AFTER THE MONITORING

FIG. 5

MULTI-BEAM PHYSICAL DOWNLINK CONTROL CHANNEL (PDCCH) VIA MONITORING AGGREGATION

CROSS-REFERENCE TO RELATED APPLICATION(S)

This application is a continuation of U.S. Non-Provisional application Ser. No. 17/343,237, entitled "MULTI-BEAM PHYSICAL DOWNLINK CONTROL CHANNEL (PDCCH) VIA MONITORING AGGREGATION", filed Jun. 9, 2021, which claims the benefit of priority to U.S. Provisional Application No. 63/038,437 filed Jun. 12, 2020, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for control channel communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved control channel communication.

Certain aspects of the subject matter described in this disclosure can be implemented in a method for wireless communication by a user equipment (UE). The method generally includes monitoring for a physical downlink control channel (PDCCH) in each of a plurality of monitoring occasions in a search space, wherein the PDCCHs are associated with the same downlink control information (DCI), and wherein the plurality of monitoring occasions are monitored using different beams; and decoding the PDCCHs after the monitoring.

Certain aspects of the subject matter described in this disclosure can be implemented in a method for wireless communication by a base station (B S). The method generally includes generating a PDCCH in each of a plurality of monitoring occasions in a search space, wherein the PDCCHs are associated with the same DCI, and wherein the PDCCHs in the plurality of monitoring occasions are transmitted using different beams; and transmitting the PDCCHs.

Certain aspects of the subject matter described in this disclosure can be implemented in an apparatus for wireless communication by a UE. The apparatus generally includes a memory, and one or more processors coupled to the memory, the memory and the one or more processors being configured to monitor for a PDCCH in each of a plurality of monitoring occasions in a search space, wherein the PDCCHs are associated with the same DCI, and wherein the plurality of monitoring occasions are monitored using different beams; and decode the PDCCHs after the monitoring.

Certain aspects of the subject matter described in this disclosure can be implemented in an apparatus for wireless communication by a BS. The apparatus generally includes a memory, and one or more processors coupled to the memory, the memory and the one or more processors being configured to generate a PDCCH in each of a plurality of monitoring occasions in a search space, wherein the PDCCHs are associated with the same DCI, and wherein the PDCCHs in the plurality of monitoring occasions are transmitted using different beams; and transmit the PDCCHs.

Certain aspects of the subject matter described in this disclosure can be implemented in an apparatus for wireless communication by a UE. The apparatus generally includes means for monitoring for a PDCCH in each of a plurality of monitoring occasions in a search space, wherein the PDCCHs are associated with the same DCI, and wherein the plurality of monitoring occasions are monitored using different beams; and means for decoding the PDCCHs after the monitoring.

Certain aspects of the subject matter described in this disclosure can be implemented in an apparatus for wireless communication by a BS. The apparatus generally includes means for generating a PDCCH in each of a plurality of monitoring occasions in a search space, wherein the PDCCHs are associated with the same DCI, and wherein the PDCCHs in the plurality of monitoring occasions are transmitted using different beams; and means for transmitting the PDCCHs.

Certain aspects of the subject matter described in this disclosure can be implemented in a computer-readable medium having instructions stored thereon to cause a UE to monitor for a PDCCH in each of a plurality of monitoring occasions in a search space, wherein the PDCCHs are associated with the same DCI, and wherein the plurality of monitoring occasions are monitored using different beams; and decode the PDCCHs after the monitoring.

Certain aspects of the subject matter described in this disclosure can be implemented in a computer-readable medium having instructions stored thereon to cause a BS to generate a PDCCH in each of a plurality of monitoring occasions in a search space, wherein the PDCCHs are associated with the same DCI, and wherein the PDCCHs in the plurality of monitoring occasions are transmitted using different beams; and transmit the PDCCHs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and the description may admit to other equally effective aspects.

FIG. 4 is a flow diagram illustrating example operations for wireless communication by a BS, in accordance with certain aspects of the present disclosure.

FIG. 5 is a flow diagram illustrating example operations for wireless communication by a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
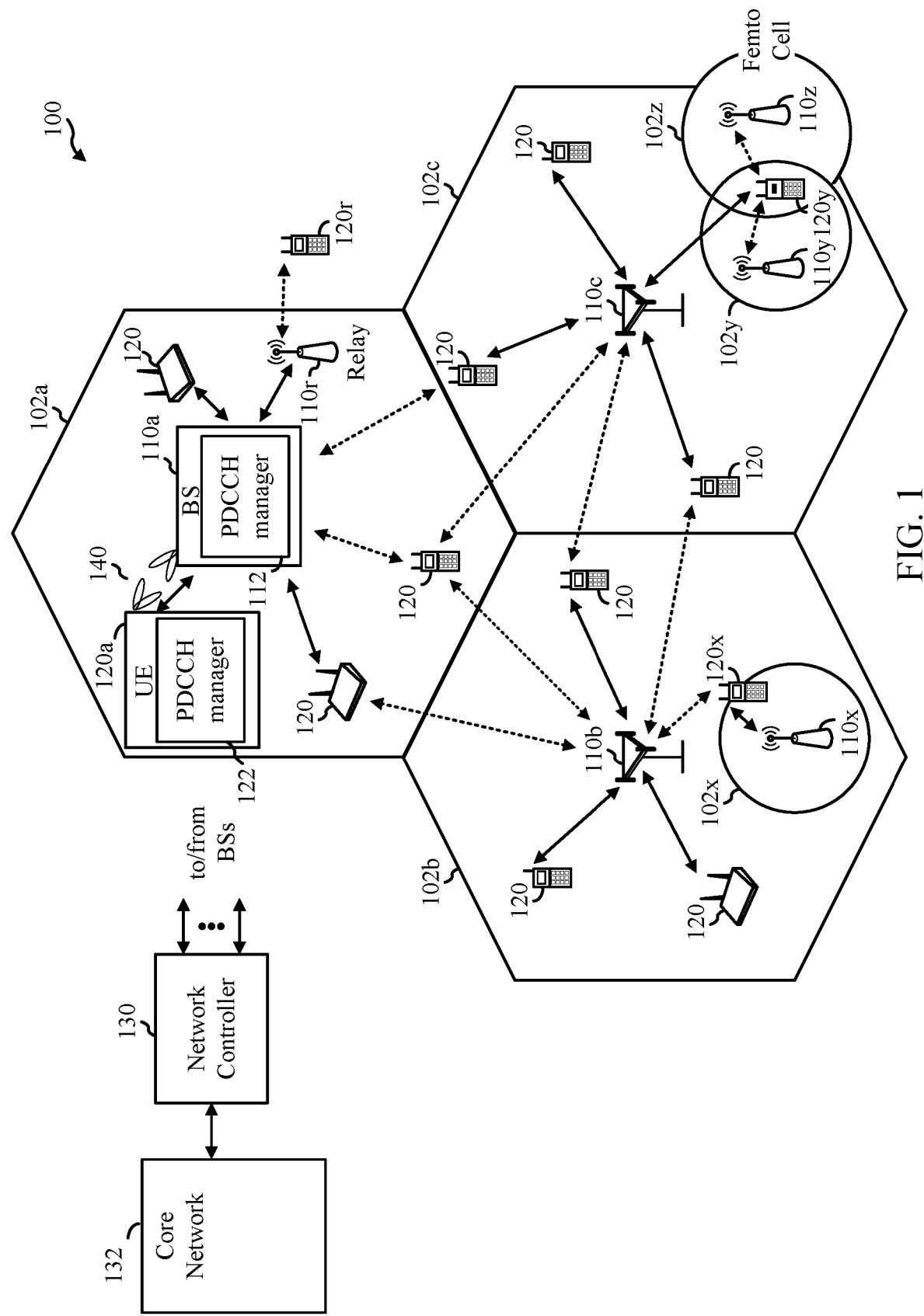
FIG. 1 is a block diagram conceptually illustrating an example telecommunications system, in accordance with certain aspects of the present disclosure.

Aspects of the present disclosure provide apparatus, methods, processing systems, and computer readable mediums for communicating control channels (e.g., physical downlink control channels (PDCCHs)) by aggregating monitoring occasions. In some cases, with reduced wireless coverage, reliability of a user equipment (UE) receiving PDCCHs transmitted by the network may be decreased. For this reason, the aspects described herein provide techniques for transmitting multiple repeated PDCCHs (e.g., PDCCHs indicating the same control information) using multiple (aggregated) monitoring occasions (e.g., an interval a UE uses to monitor for the PDCCH), where the PDCCHs in the multiple monitoring occasions are transmitted using different beams. Transmitting multiple repeated PDCCHs in different monitoring occasions having the same control information allows a UE to aggregate the monitoring occasions and more reliably decode the control information by combining the PDCCHs. Multi-beam PDCCH communication via monitoring aggregation may provide beam diversity (e.g., transmissions and monitoring of transmissions using multiple beams) to improve PDCCH coverage and reliability. In some aspects, the beams to be used for monitoring the occasions may be configured (e.g., preconfigured) at a UE, and dynamically activated or deactivated via signaling from a base station (BS). In some aspects, the multiple PDCCHs may be transmitted using the same codebook, allowing combining of the PDCCHs for decoding.

In some aspects, monitoring occasions may be aggregated during a transition period when switching from one beam to another. For example, the UE may receive, on a channel from a BS, an indication of a command to switch from a first beam to a second beam, and transmit an acknowledgement (ACK) indicating that the channel has been successfully decoded. When the UE transmits the ACK indicating that the channel has been decoded, the UE may not have yet parsed the signaling including the beam switch command. Thus, aspects of the present disclosure allow for, when switching from a first beam to a second beam, PDCCHs to be transmitted on aggregated monitoring occasions using the first beam and the second beam prior to a point in time when the beam switch occurs. Multi-beam PDCCH, via monitoring aggregation, activated during this time window helps to ensure communications are not missed when beam switching (e.g., due to beam mismatch).

The following description provides examples of control channel transmission and monitoring in communication systems, and is not limiting of the scope, applicability, or examples set forth in the claims. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or UEs 120 in the wireless communication network 100 via one or more interfaces.

As illustrated in FIG. 1, the wireless communication network 100 may include a number of BSs 110*a*-*z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS 110 may support one or multiple cells. A network controller 130 may couple to a set of BSs 110 and provide coordination and control for these BSs 110 (e.g., via a backhaul).

The BSs 110 communicate with UEs 120*a*-*y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

As shown in FIG. 1, one or more transmit (TX) and receive (RX) beams 140 may be used for communication (e.g., DL and uplink (UL) communication) between BS 110*a* and UE 120*a*. In some cases, a first beam 140 used for communication between BS 110*a* and UE 120*a* may be switched to a second beam (e.g., in accordance with a beam switch command).

According to certain aspects, the BSs 110 and UEs 120 may be configured for communication of physical downlink control channels (PDCCHs) in aggregated monitoring occasions. As shown in FIG. 1, the BS 110*a* includes a PDCCH manager 112. The PDCCH manager 112 may be configured to generate a PDCCH in each of a plurality of monitoring occasions in a search space, wherein the PDCCHs are associated with the same downlink control information (DCI), and wherein the PDCCHs in the plurality of monitoring occasions are transmitted using different beams; and transmit the PDCCHs, in accordance with certain aspects of the present disclosure. As shown in FIG. 1, the UE 120*a* includes a PDCCH manager 122. The PDCCH manager 122 may be configured to monitor for a PDCCH in each of a plurality of monitoring occasions in a search space, wherein the PDCCHs are associated with the same DCI, and wherein the plurality of monitoring occasions are monitored using different beams; and decode the PDCCHs after the monitoring, in accordance with certain aspects of the present disclosure.

Figure 2:
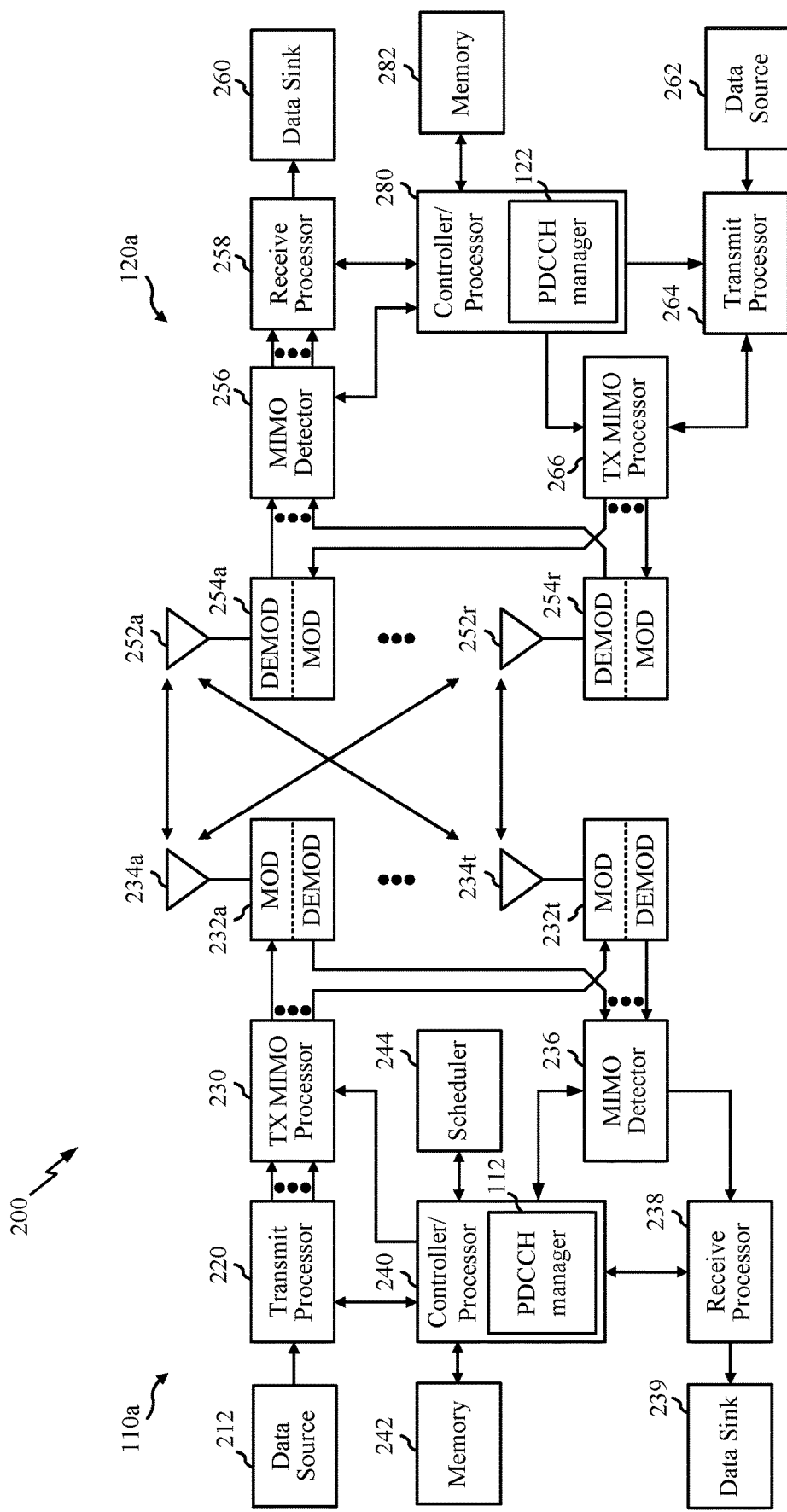
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid automatic repeat request (ARQ) indicator channel (PHICH), PDCCH, group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a DL signal. DL signals from modulators in transceivers 232a-232t may be transmitted via the antennas 234a-234t, respectively.

At the UE 120a, the antennas 252a-252r may receive the DL signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink (UL), at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for single-carrier frequency division multiplexing (SC-FDM), etc.), and transmitted to the BS 110a. At the BS 110a, the UL signals from the UE 120a may be received by the antennas 234, processed by the modulators, detected by a MIMO detector 236, if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a PDCCH manager 112, according to aspects described herein. Similarly, as shown in FIG. 2, the controller/processor 280 of the UE 120a has PDCCH manager 122, according to aspects described herein. Although shown at the controller/processor, other components of the UE 120a and BS 110a may be used to perform the operations described herein.

NR may utilize OFDM with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Figure 3:
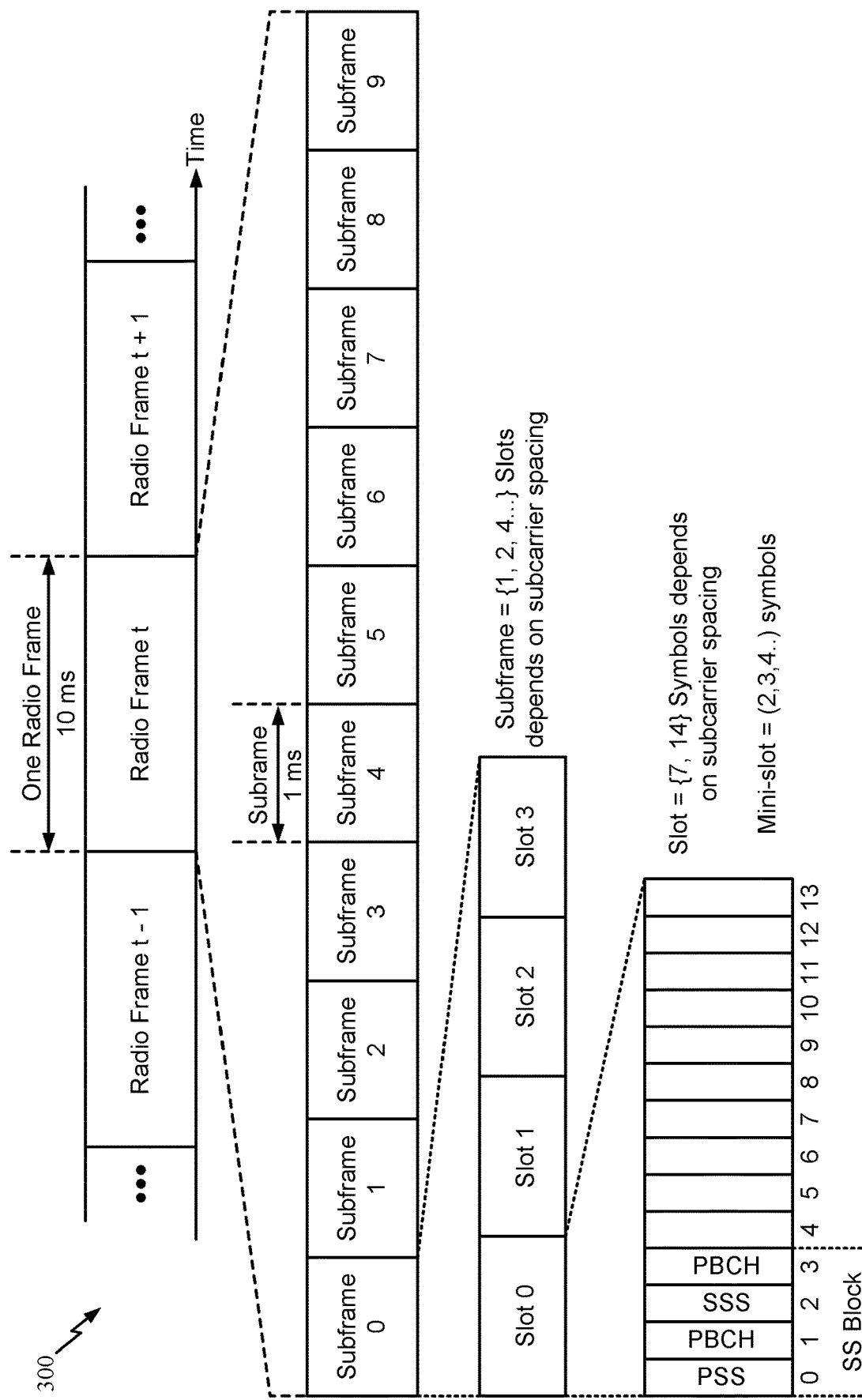
FIG. 3 is an example frame format for new radio (NR), in accordance with certain aspects of the present disclosure.

FIG. 3 is a diagram showing an example of a frame format 300 for NR in accordance with certain aspects of the present disclosure. The transmission timeline for each of the DL transmission and UL transmission may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Techniques for Multi-Beam Physical Downlink Control Channel (PDCCH) Communication Via Monitoring Aggregation In new radio (NR), a physical downlink control channel (PDCCH) is transmitted over a Control Resource Set (CORESET). The CORESET may have 1, 2, or 3 orthogonal frequency division multiplexing (OFDM) symbols. A set of potential PDCCH candidates is referred to as a search space and is associated with a CORESET. The PDCCH candidates may be monitored for in configurable monitoring occasions having a configured periodicity (e.g., in terms of number of slots) and may be a set of symbols indicating a beginning of each monitoring occasion in a monitored slot. In other words, there may be multiple monitoring occasions per slot. Increasing the number of OFDM symbols for PDCCH transmission may be a way to increase the coverage of PDCCH. In some aspects, a group-common downlink control information (DCI) may be used to activate a configured (e.g., preconfigured) monitoring aggregation (e.g., grouping of PDCCH monitoring occasions for repetition of a PDCCH associated with the same DCI).

PDCCH monitoring aggregation may effectively produce virtual CORESETs with a larger number of OFDM symbols, where its OFDM symbols are either contiguous or non-contiguous. CORESETs may be transmitted using a single beam associated with one transmission configuration indicator (TCI) state configured and activated at any point in time. In other words, certain implementations may only support single-beam PDCCH.

Certain aspects of the present disclosure are directed to a multi-beam PDCCH transmitted using aggregated monitoring occasions for improving performance with beam diversity. For example, multiple repeated PDCCHs (e.g., PDCCHs transmitted using the same downlink control information (DCI)) may be transmitted using multiple monitoring occasions, where the PDCCHs in multiple monitoring occasions are transmitted using different beams. In some aspects, the beams to be used for monitoring the occasions may be configured (e.g., preconfigured) at the UE, and dynamically activated or deactivated dynamically via signaling from the BS. In some aspects, monitoring occasions may be aggregated during a transition period when switching from one beam to another. For example, when switching from a first beam to a second beam, PDCCHs may be transmitted on aggregated monitoring occasions using the first beam and the second beam prior to a point in time when the beam switch occurs FIG. 4 is a flow diagram illustrating example operations 400 for wireless communication by a BS, in accordance with certain aspects of the present disclosure. The operations 400 may be performed, for example, by a BS 110a in the wireless communication network 100. In some cases, operations 400 may be performed by a distributed unit (DU) component of the BS. For example, where a distributed radio access network (RAN) is implemented in the wireless communication network, the BS may include a centralized unit (CU) and one or more DUs, where the CU of the BS is connected to the DU. The DU component of the BS may host one or more transmit/receive points (TRP(s)) and communicate with a UE.

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at block 402, by the BS generating a PDCCH in each of a plurality of monitoring occasions in a search space. In certain aspects, the PDCCHs may be associated with the same DCI, and the PDCCHs in the plurality of monitoring occasions may be transmitted using different beams. At block 404, the BS transmits the PDCCHs.

FIG. 5 is a flow diagram illustrating example operations 500 for wireless communication by a UE, in accordance with certain aspects of the present disclosure. The operations 500 may be performed, for example, by UE 120a in the wireless communication network 100. The operations 500 may be complementary operations by the UE to the operations 400 performed by the BS.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 502, by the UE monitoring for a PDCCH in each of a plurality of monitoring occasions in a search space. As described, the PDCCHs may be associated with the same DCI. In certain aspects, the plurality of monitoring occasions may be monitored using different beams. At block 504, the UE may decode the PDCCHs after the monitoring.

In other words, a PDCCH may be repeated over multiple monitoring occasions using possibly different beams for different monitoring occasions. For example, the PDCCHs may include a first PDCCH in a first monitoring occasion of the plurality of monitoring occasions and a second PDCCH in a second monitoring occasion of the plurality of monitoring occasions. The second PDCCH may be a repeated version of the first PDCCH (e.g., the first and second PDCCH may be encoded the same and indicate the same control information). In some cases, the second PDCCH may be a different redundancy version of the first PDCCH. For example, the first and second PDCCH may be encoded differently but still indicate the same control information (e.g., associated with the same DCI).

In certain aspects, one or more other channels (e.g., physical downlink shared channel (PDSCH)) may follow the beam assignment of PDCCH. For example, the one or more other channels may be assumed to be quasi-co located (QCL) with PDCCH. QCL generally refers to assumptions (e.g., such as the associated beam) that, for a set of signals or channels considered to be QCL related (or simply "QCL'd" for short), certain characteristics derived for (measured from) one of the signals or channels may be applied to the other. In other words, the beam associated with a certain monitoring occasion (e.g., the first beam as configured for the monitoring of the occasions) may be used as the reference for determining a beam for transmission and reception of another channel (e.g., PDSCH). That is, the UE may receive, from a BS, one or more other channels using one or more of the different beams used to monitor, at block 502, for the PDCCHs.

In certain aspects, the rules for selecting beams (i.e. TCI states) associated with the monitoring occasions may be configured as part of a search space configuration. In other words, the UE may determine the different beams used to monitor, at block 502, the plurality of monitoring occasions based on a configuration of the search space.

In certain aspects, beams associated with the monitoring occasions may be indicated explicitly by the BS. For example, the UE may receive, from a BS, a configuration of the different beams used to monitor, at block 502, the plurality of monitoring occasions.

In certain aspects, a subset of beams associated with the aggregated monitoring occasions may be selected based on other signaling from the BS or UE (e.g. second best beam reported in a layer-1 (L1) report). For example, the UE may select the different beams based on beams previously communicated between the UE and the BS, such as beams indicated in an L1 report. The different beams used to monitor the monitoring occasions may correspond to a subset of the beams previously communicated between the UE and the BS.

In certain aspects, the monitoring occasions or the rules for selecting the associated beams may be configured (e.g., preconfigured). In this case, the configured monitoring occasions (or rules for selecting the beams), may be activated or deactivated by dynamic signaling. For example, the UE may receive signaling activating the monitoring, at block 502, of the plurality of monitoring occasions using the different beams. In some cases, the monitoring occasions, or the rules for selecting the associated beams, may be activated or deactivated by medium access control (MAC)-control element (CE), UE-specific DCI, or group-common DCI.

Figure 6A:
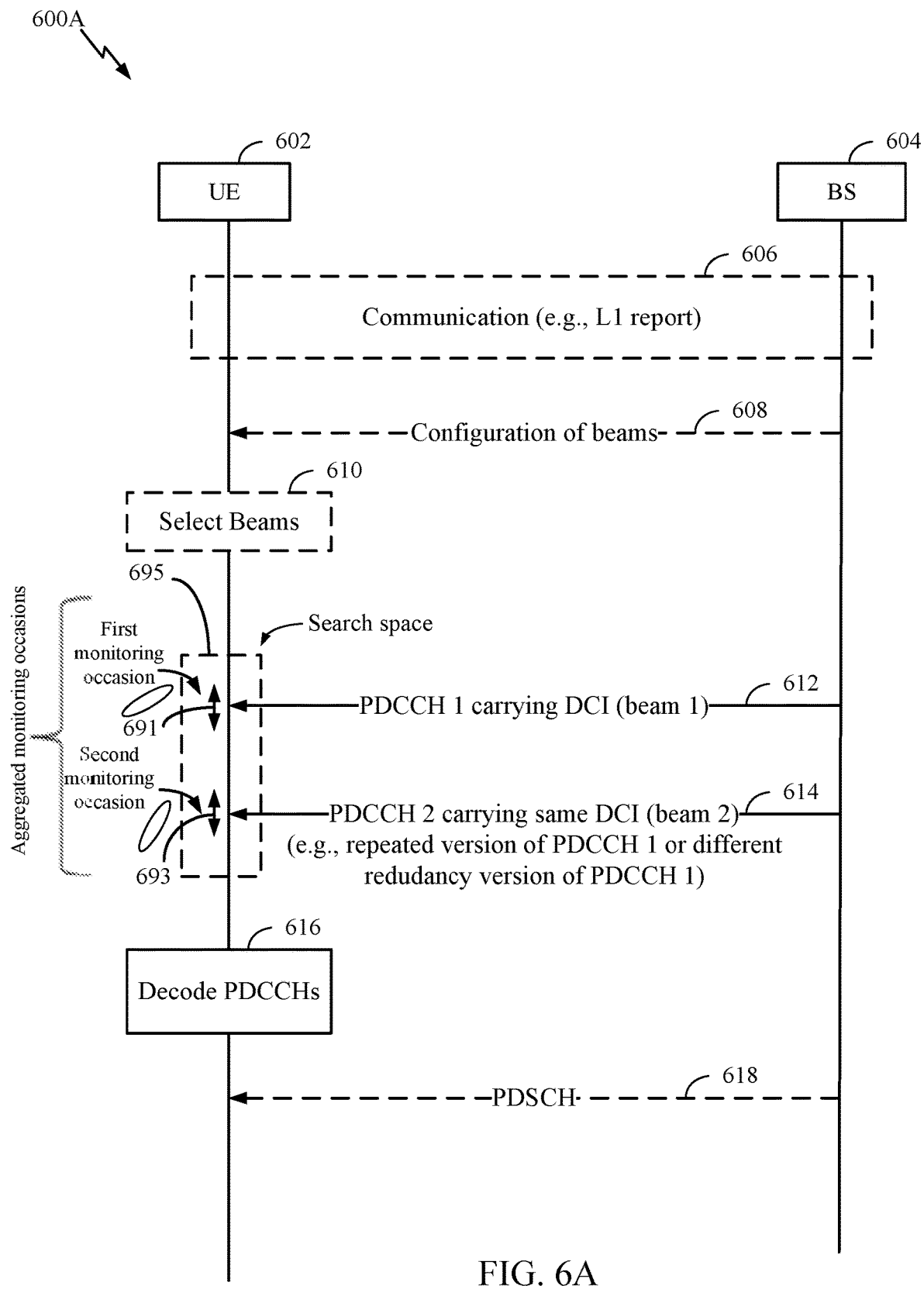
FIG. 6A is a call flow diagram illustrating example transmission of multiple physical downlink control channels (PDCCHs) using multiple monitoring occasions and multiple beams, in accordance with certain aspects of the present disclosure.

FIG. 6A is a call flow diagram 600A illustrating example transmission of multiple PDCCHs using multiple monitoring occasions and multiple beams, in accordance with certain aspects of the present disclosure. As shown, a first PDCCH 612 may be transmitted by BS 604, to UE 602, using a first beam. First PDCCH 612 may be transmitted in a first monitoring occasion 691 of a plurality of monitoring occasions in a search space 695. Additionally, a second PDCCH 614 may be transmitted by BS 604, to UE 602, using a second beam. Second PDCCH 614 may be transmitted in a second monitoring occasion 693 of the plurality of monitoring occasions in the search space 695. UE 602 may monitor for each of the first PDCCH 612 and the second PDCCH 614 in the plurality of monitoring occasions using different beams. At block 616, the UE may decode the first PDCCH 612 and the second PDCCH 614. PDCCH 614 may be a repeated version of PDCCH 612.

In some aspects, UE 602 may receive, from BS 604, a configuration 608 of the different beams to use for monitoring for the first PDCCH 612 and the second PDCCH 614. Alternatively, in some aspects, at block 610, UE 602 may select beams for monitoring for the first PDCCH 612 and the second PDCCH 614 based on previous communication 606 of beams between UE 602 and BS 604. In some aspects, UE 602 may receive, from BS 604, PDSCH 618 using one or more of the beams used to monitor for the first PDCCH 612 or the second PDCCH 614.

In some aspects, multi-beam PDCCH, via monitoring aggregation, may be activated implicitly based on another procedure. For example, during control beam switching, within 3 ms after a UE transmits an acknowledgement (ACK) of a PDSCH carrying a beam-switching command (e.g., in a MAC-CE of the PDSCH) for switching from one beam to another, a configured (e.g., preconfigured) monitoring aggregation may be used for monitoring PDCCH, where a first monitoring occasion (e.g., among two aggregated occasions) is associated with an old beam and the second monitoring occasion (e.g., among the two aggregated occasions) is associated with the new beam (e.g., indicated by MAC CE). For example, the UE may receive, on a channel (e.g., PDSCH) from a BS, an indication of a switch from a first beam to a second beam, and transmit an ACK indicating that the channel has been successfully decoded. In this case, the monitoring, at block 502, for the PDCCHs using the different beams may be performed during a configured time window starting after the transmission of the ACK. The beam switching may occur at an end of the configured time window during which the plurality of monitoring occasions are monitored using the different beams.

Figure 6B:
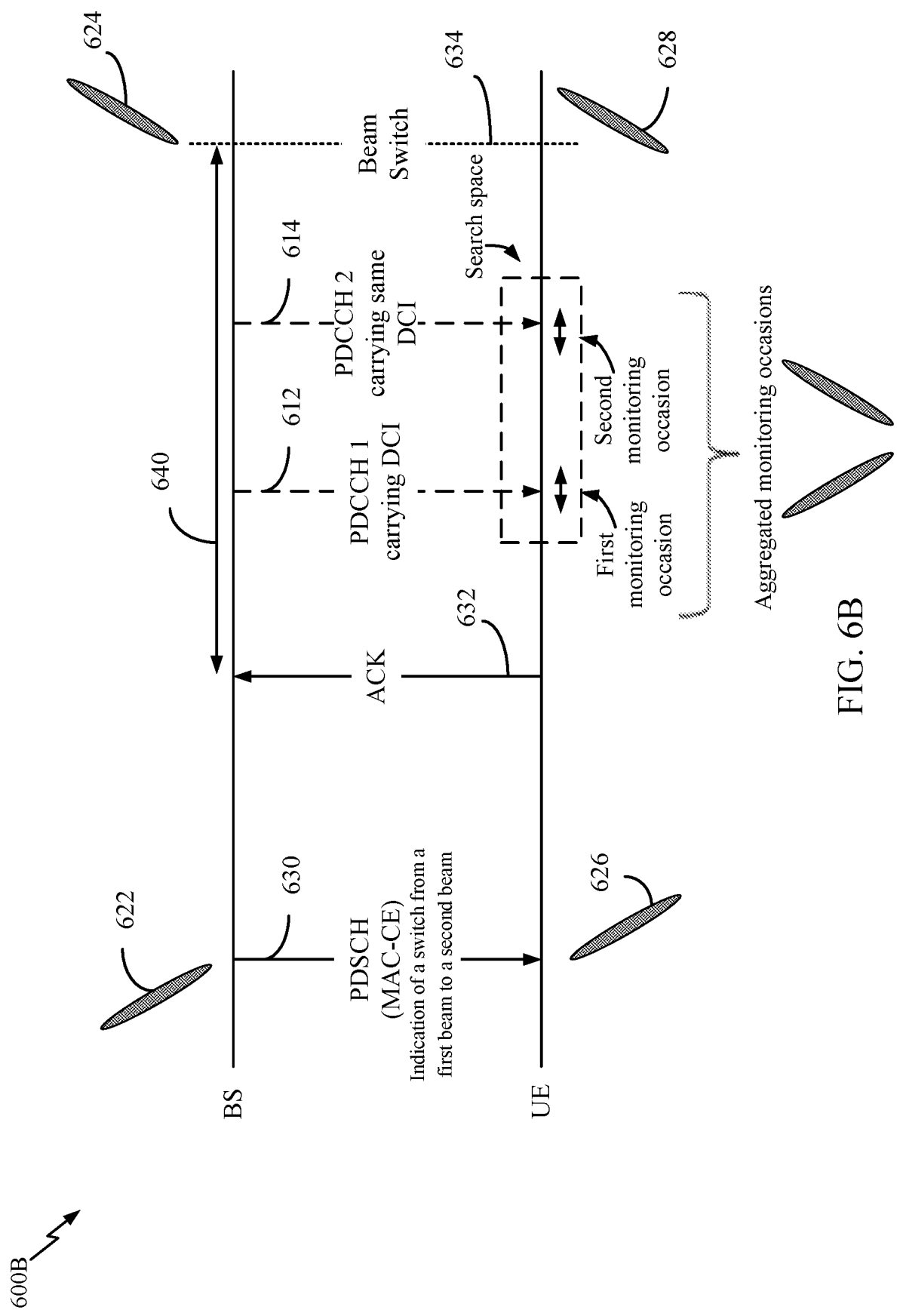
FIG. 6B illustrates example operations for beam switching, in accordance with certain aspects of the present disclosure.

FIG. 6B illustrates example operations 600B for beam switching, in accordance with certain aspects of the present disclosure. As illustrated in operations 600B, a BS may transmit a PDSCH 630 having a MAC-CE, the MAC-CE including a beam switch command. For example, the MAC-CE may indicate that a switch from transmit beam 622 to transmit beam 624 is to occur for communication. Similarly, the UE may switch from receive beam 626 to receive beam 628 to continue communication. Following receipt of the PDSCH 630, the UE may transmit an ACK 632 to be BS indicating the PDSCH 630 has been decoded successfully. At time 634, the beam switch may occur. Time 634 may be 3 milliseconds (ms) after the transmission of the ACK 632.

When the UE transmits the ACK 632 indicating that the PDSCH 630 has been decoded, the UE may not have yet parsed the MAC-CE including the beam switch command. Thus, the beam switch may occur 3 ms (or any other configured time duration) after the ACK 632 is transmitted, providing sufficient time for the UE to parse the MAC-CE and switch the configured beam at the UE. Therefore, within the time window 640, starting from transmission of ACK 632 and time 634, the BS may transmit PDCCH using aggregated monitoring occasions using both beams 622, 624, allowing the UE to receive the PDCCH using either the receive beam 626 or receive beam 628 (or both).

Figure 7:
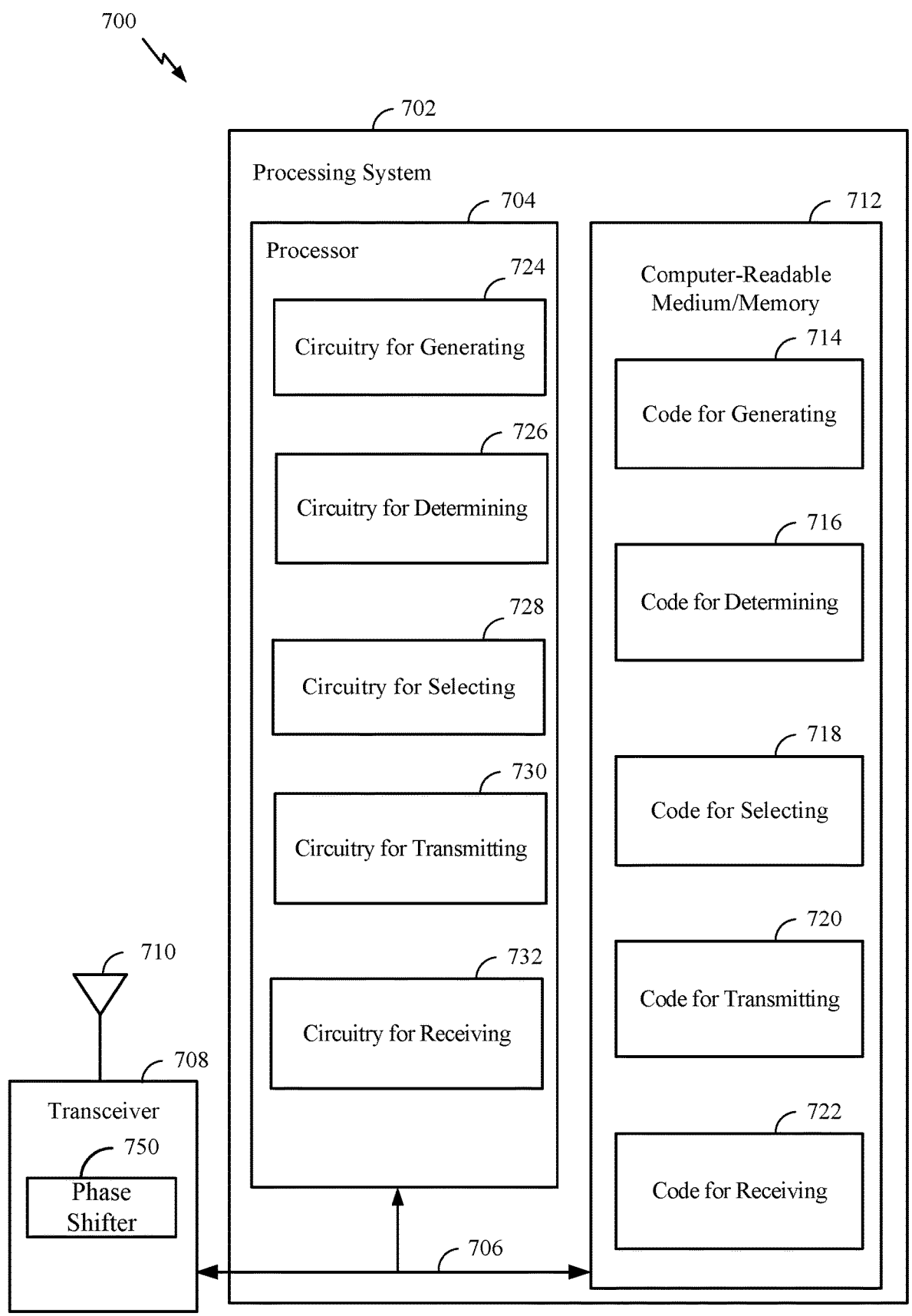
FIG. 7 illustrates a communications device that may include various components configured to perform operations for the techniques disclosed herein in accordance with aspects of the present disclosure.

FIG. 7 illustrates a communications device 700 that includes various components operable, configured, or adapted configured to perform operations for the techniques disclosed herein, such as the operations depicted and described with respect to FIG. 4. In some examples, communication device 700 may be a BS, such as BS 110a as described, for example with respect to FIGS. 1 and 2.

Communications device 700 includes a processing system 702 coupled to a transceiver 708 (e.g., a transmitter and/or a receiver). Transceiver 708 is configured to transmit (or send) and receive signals for the communications device 700 via an antenna 710, such as the various signals as described herein. In some cases, the transceiver 708 may include a phase shifter 750. Phase shifter 750 may be used to perform phase shifting of signals for transmission via antennas to implement beamforming. Processing system 702 may be configured to perform processing functions for the communications device 700, including processing signals received and/or to be transmitted by the communications device 700.

Processing system 702 includes one or more processors 704 coupled to a computer-readable medium/memory 712 via a bus 706. In certain aspects, the computer-readable medium/memory 712 is configured to store instructions (e.g., computer-executable code) that when executed by the one or more processors 704, cause the one or more processors 704 to perform the operations illustrated in FIG. 4, or other operations for performing the various techniques discussed herein for PDCCH communication.

In certain aspects, computer-readable medium/memory 712 stores code 714 (e.g., an example of means for) for generating; code 716 (e.g., an example of means for) for determining; code 718 (e.g., an example of means for) for selecting; code 720 (e.g., an example of means for) for transmitting; and code 722 for receiving.

In certain aspects, the processor 704 has circuitry configured to implement the code stored in the computer-readable medium/memory 712. The processor 704 includes circuitry 724 (e.g., an example of means for) for generating; circuitry 726 (e.g., an example of means for) for determining; circuitry 728 (e.g., an example of means for) for selecting; circuitry 730 (e.g., an example of means for) for transmitting; and circuitry 732 (e.g., an example of means for) for receiving.

Various components of communications device 700 may provide means for performing the methods described herein, including with respect to FIG. 4.

In some examples, means for transmitting or sending (or means for outputting for transmission) may include the transceivers 232 and/or antenna(s) 234 of the BS 110*a* illustrated in FIG. 2 and/or transceiver 708 and antenna 710 of the communication device 700 in FIG. 7. In some examples, means for receiving (or means for obtaining) may include the transceivers 232 and/or antenna(s) 234 of the BS 110*a* illustrated in FIG. 2 and/or transceiver 708 and antenna 710 of the communication device 700 in FIG. 7.

In some examples, means for generating, means for determining, and means for selecting may include various processing system components, such as: the one or more processors 704 in FIG. 7, or aspects of the BS 110*a* depicted in FIG. 2, including receive processor 238, transmit processor 220, TX MIMO processor 230, and/or controller/processor 240 (including PDCCH manager 112).

Notably, FIG. 7 is just use example, and many other examples and configurations of communication device 700 are possible.

Figure 8:
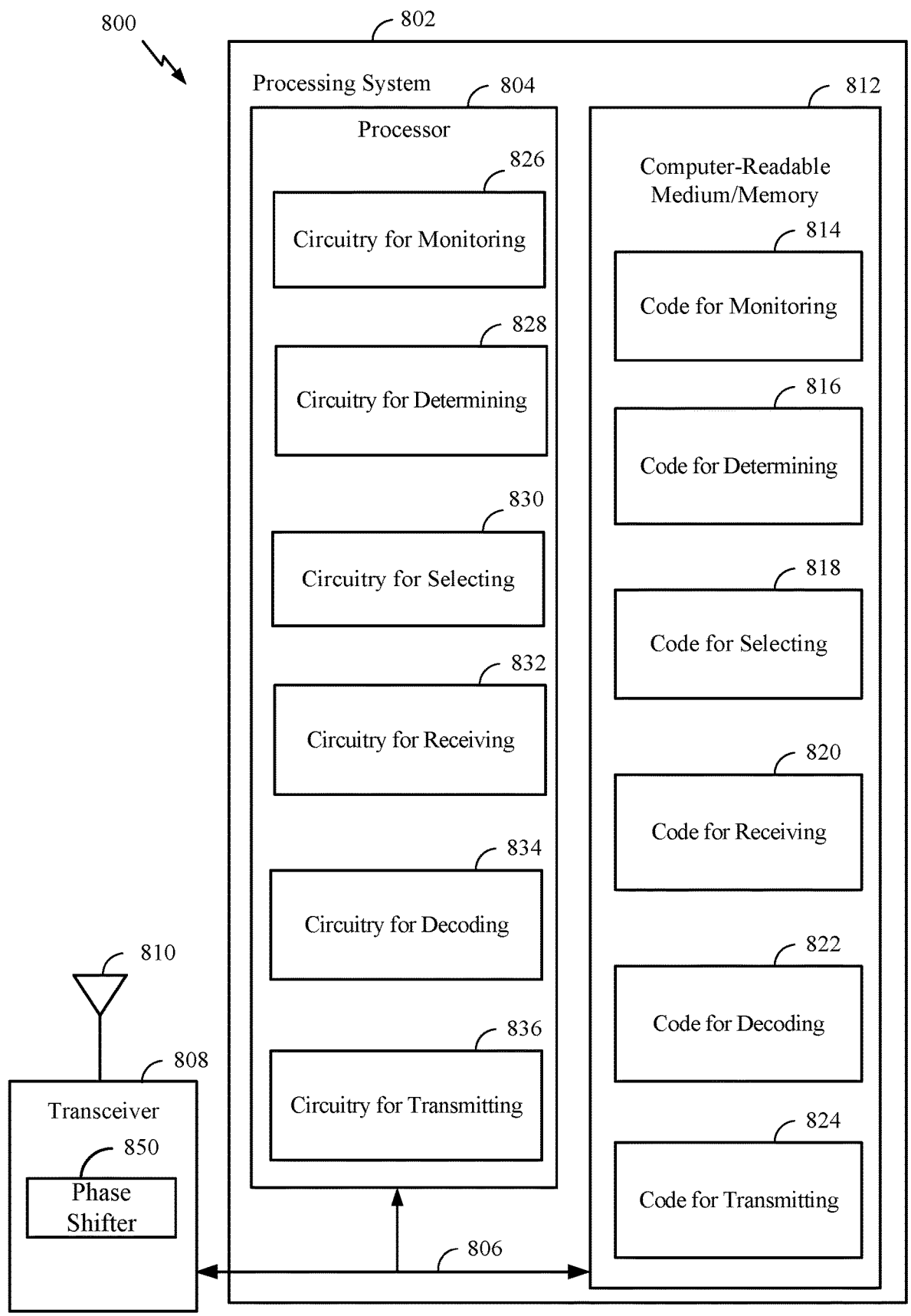
FIG. 8 illustrates a communications device that may include various components configured to perform operations for the techniques disclosed herein in accordance with aspects of the present disclosure.

FIG. 8 illustrates a communications device 800 that includes various components operable, configured, or adapted configured to perform operations for the techniques disclosed herein, such as the operations depicted and described with respect to FIG. 5. In some examples, communication device 800 may be a UE, such as UE 120*a* as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. In some cases, the transceiver 808 may include a phase shifter 850. Phase shifter 850 may be used to perform phase shifting of signals for transmission via antennas to implement beamforming. Processing system 802 may be configured to perform processing functions for the communications device 800, including processing signals received and/or to be transmitted by the communications device 800.

Processing system 802 includes one or more processors 804 coupled to a computer-readable medium/memory 812 via a bus 806. In certain aspects, the computer-readable medium/memory 812 is configured to store instructions (e.g., computer-executable code) that when executed by the one or more processors 804, cause the one or more processors 804 to perform the operations illustrated in FIG. 5, or other operations for performing the various techniques discussed herein for PDCCH communication.

In certain aspects, computer-readable medium/memory 812 stores code 814 (e.g., an example of means for) for monitoring; code 816 (e.g., an example of means for) for determining; code 818 (e.g., an example of means for) for selecting; code 820 (e.g., an example of means for) for receiving; code 822 (e.g., an example of means for) for decoding; and code 824 (e.g., an example of means for) for transmitting.

In certain aspects, the processor 804 has circuitry configured to implement the code stored in the computer-readable medium/memory 812. The processor 804 includes circuitry 826 (e.g., an example of means for) for monitoring; circuitry 828 (e.g., an example of means for) for determining; circuitry 830 (e.g., an example of means for) for selecting; circuitry 832 (e.g., an example of means for) for receiving; circuitry 834 (e.g., an example of means for) for decoding; and circuitry 836 (e.g., an example of means for) for transmitting.

Various components of communications device 800 may provide means for performing the methods described herein, including with respect to FIG. 5.

In some examples, means for transmitting or sending (or means for outputting for transmission) may include the transceivers 254 and/or antenna(s) 252 of the UE 120*a* illustrated in FIG. 2 and/or transceiver 808 and antenna 810 of the communication device 800 in FIG. 8. In some examples, means for receiving (or means for obtaining) may include the transceivers 254 and/or antenna(s) 252 of the UE 120*a* illustrated in FIG. 2 and/or transceiver 808 and antenna 810 of the communication device 800 in FIG. 8.

In some examples, means for monitoring, means for determining, means for selecting, and means for decoding may include various processing system components, such as: the one or more processors 804 in FIG. 8, or aspects of the UE 120*a* depicted in FIG. 2, including receive processor 258, transmit processor 264, TX MIMO processor 266, and/or controller/processor 280 (including PDCCH manager 122).

Notably, FIG. 8 is just use example, and many other examples and configurations of communication device 800 are possible.

The PDCCH manager 112 or 122 may support wireless communication in accordance with examples as disclosed herein.

The PDCCH manager 112 or 122 may be an example of means for performing various aspects described herein. The PDCCH manager 112 or 122, or its sub-components, may be implemented in hardware (e.g., in uplink resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the PDCCH manager 112 or 122, or its sub-components, may be implemented in code (e.g., as configuration management software or firmware) executed by a processor, or any combination thereof. If implemented in code executed by a processor, the functions of the PDCCH manager 112 or 122, or its sub-components may be executed by a general-purpose processor, a DSP, an ASIC, a FPGA or other programmable logic device.

In some examples, the PDCCH manager 112 or 122 may be configured to perform various operations (e.g., receiving, determining, transmitting) using or otherwise in cooperation with the transceiver 708 or 808.

The PDCCH manager 112 or 122, or its sub-components, may be physically located at various positions, including being distributed such that portions of functions are implemented at different physical locations by one or more physical components. In some examples, the PDCCH manager 112 or 122, or its sub-components, may be a separate and distinct component in accordance with various aspects of the present disclosure. In some examples, the PDCCH manager 112 or 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

EXAMPLE CLAUSES

Implementation examples are described in the following numbered clauses:

Clause 1: A method for wireless communication by a user equipment (UE), comprising: monitoring for a physical downlink control channel (PDCCH) in each of a plurality of monitoring occasions in a search space, wherein the PDCCHs are associated with the same downlink control information (DCI), and wherein the plurality of monitoring occasions are monitored using different beams; and decoding the PDCCHs after the monitoring.

Clause 2: The method of Clause 1, wherein the PDCCHs comprise: a first PDCCH in a first monitoring occasion of the plurality of monitoring occasions; and a second PDCCH in a second monitoring occasion of the plurality of monitoring occasions, the second PDCCH being a repeated version of the first PDCCH.

Clause 3: The method of Clause 1 or 2, wherein the PDCCHs comprise: a first PDCCH in a first monitoring occasion of the plurality of monitoring occasions; and a second PDCCH in a second monitoring occasion of the plurality of monitoring occasions, the second PDCCH being a different redundancy version of the first PDCCH.

Clause 4: The method of any of Clauses 1-3, further comprising receiving, from a base station (BS), one or more channels using one or more of the different beams used to monitor for the PDCCHs.

Clause 5: The method of any of Clauses 1-4, further comprising determining the different beams used to monitor the plurality of monitoring occasions based on a configuration of the search space.

Clause 6: The method of any of Clauses 1-5, further comprising receiving, from a BS, a configuration of the different beams used to monitor the plurality of monitoring occasions.

Clause 7: The method of any of Clauses 1-6, further comprising selecting the different beams based on beams previously communicated between the UE and a BS.

Clause 8: The method of Clause 7, wherein the different beams correspond to a subset of the beams previously communicated between the UE and the BS.

Clause 9: The method of Clause 8, wherein the beams previously communicated between the UE and the BS comprise beams indicated in a layer-1 (L1) report.

Clause 10: The method of any of Clauses 1-9, further comprising receiving signaling activating the monitoring of the plurality of monitoring occasions using the different beams.

Clause 11: The method of Clause 10, wherein the signaling comprises a medium access control (MAC)-control element (CE), UE-specific downlink control information (DCI), or group-common DCI.

Clause 12: The method of any of Clauses 1-11, further comprising: receiving, on a channel from a BS, an indication of a switch from a first beam to a second beam; and transmitting an acknowledgement indicating that the channel is successfully decoded, wherein the monitoring for the PDCCHs using the different beams is performed during a configured time window starting after the transmission of the acknowledgement.

Clause 13: The method of Clause 12, wherein the beam switching occurs at an end of the configured time window during which the plurality of monitoring occasions are monitored using the different beams.

Clause 14: The method of Clause 12 or 13, wherein the plurality of monitoring occasions comprise: a first monitoring occasion monitored using the first beam; and a second monitoring occasion monitored using the second beam.

Clause 15: A method for wireless communication by a base station (BS), comprising: generating a physical downlink control channel (PDCCH) in each of a plurality of monitoring occasions in a search space, wherein the PDCCHs are associated with the same downlink control information (DCI), and wherein the PDCCHs in the plurality of monitoring occasions are transmitted using different beams; and transmitting the PDCCHs.

Clause 16: The method of Clause 15, wherein the PDCCHs comprise: a first PDCCH in a first monitoring occasion of the plurality of monitoring occasions; and a second PDCCH in a second monitoring occasion of the plurality of monitoring occasions, the second PDCCH being a repeated version of the first PDCCH.

Clause 17: The method of Clause 15 or 16, wherein the PDCCHs comprise: a first PDCCH in a first monitoring occasion of the plurality of monitoring occasions; and a second PDCCH in a second monitoring occasion of the plurality of monitoring occasions, the second PDCCH being a different redundancy version of the first PDCCH.

Clause 18: The method of any of Clauses 15-17, further comprising transmitting, to a user equipment (UE), one or more other channels using one or more of the different beams used to monitor for the control channels.

Clause 19: The method of any of Clauses 15-18, further comprising determining the different beams associated with the plurality of monitoring occasions based on a configuration of the search space.

Clause 20: The method of any of Clauses 15-19, further comprising transmitting, to a UE, a configuration of the different beams to be used to monitor the plurality of monitoring occasions.

Clause 21: The method of any of Clauses 15-20, further comprising selecting the different beams based on beams previously communicated between a UE and the BS.

Clause 22: The method of Clause 21, wherein the different beams correspond to a subset of the beams previously communicated between the UE and the BS.

Clause 23: The method of Clause 22, wherein the beams previously communicated between the UE and the BS comprise beams indicated in a layer-1 (L1) report.

Clause 24: The method of any of Clauses 15-23, further comprising transmitting signaling activating monitoring of the plurality of monitoring occasions using the different beams.

Clause 25: The method of Clause 24, wherein the signaling comprises a medium access control (MAC)-control element (CE), UE-specific downlink control information (DCI), or group-common DCI.

Clause 26: The method of any of Clauses 15-25, further comprising: transmitting, on a channel to a UE, an indication of a switch from a first beam to a second beam; and receiving an acknowledgement indicating that the channel is successfully decoded, wherein the transmitting of the PDCCHs using the different beams is performed during a configured time window starting after the transmission of the acknowledgement.

Clause 27: The method of Clause 26, wherein the beam switching occurs at an end of the configured time window during which the PDCCHs in the plurality of monitoring occasions are transmitted using the different beams.

Clause 28: The method of Clause 26 or 27, wherein the plurality of monitoring occasions comprise: a first monitoring occasion associated with the first beam; and a second monitoring occasion associated with the second beam.

Clause 29: An apparatus, comprising: a memory; and one or more processors coupled to the memory, the memory and the one or more processors being configured to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Additional Wireless Communication Network Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4 and 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method for wireless communication by a user equipment (UE), comprising:
   determining different beams to monitor a plurality of monitoring occasions based on a configuration of a search space;
   monitoring for a physical downlink control channel (PDCCH) in each of the plurality of monitoring occasions in the search space, wherein the PDCCHs are associated with the same downlink control information (DCI), and wherein the plurality of monitoring occasions are monitored using the different beams;
   receiving, on a channel from a BS, an indication of a switch from a first beam to a second beam;
   decoding the PDCCHs after the monitoring; and
   transmitting an acknowledgement indicating that the channel is successfully decoded, wherein the monitoring for the PDCCHs using the different beams is performed during a configured time window starting after the transmission of the acknowledgement.

2. The method of claim 1, wherein the PDCCHs comprise:
   a first PDCCH in a first monitoring occasion of the plurality of monitoring occasions; and
   a second PDCCH in a second monitoring occasion of the plurality of monitoring occasions, the second PDCCH being a repeated version of the first PDCCH.

3. The method of claim 1, wherein the PDCCHs comprise:
   a first PDCCH in a first monitoring occasion of the plurality of monitoring occasions; and
   a second PDCCH in a second monitoring occasion of the plurality of monitoring occasions, the second PDCCH being a different redundancy version of the first PDCCH.

4. The method of claim 1, further comprising receiving, from a base station (BS), one or more channels using one or more of the different beams used to monitor for the PDCCHs.

5. The method of claim 1, further comprising receiving, from a BS, a configuration of the different beams used to monitor the plurality of monitoring occasions.

6. The method of claim 1, further comprising selecting the different beams based on beams previously communicated between the UE and a BS.

7. The method of claim 6, wherein the different beams correspond to a subset of the beams previously communicated between the UE and the BS.

8. The method of claim 7, wherein the beams previously communicated between the UE and the BS comprise beams indicated in a layer-1 (L1) report.

9. The method of claim 1, further comprising receiving signaling activating the monitoring of the plurality of monitoring occasions using the different beams.

10. The method of claim 9, wherein the signaling comprises a medium access control (MAC)-control element (CE), UE-specific downlink control information (DCI), or group-common DCI.

11. The method of claim 1, wherein the beam switching occurs at an end of the configured time window during which the plurality of monitoring occasions are monitored using the different beams.

12. The method of claim 1, wherein the plurality of monitoring occasions comprise:
   a first monitoring occasion monitored using the first beam; and
   a second monitoring occasion monitored using the second beam.

13. A method for wireless communication by a base station (BS), comprising:
   determining different beams associated with a plurality of monitoring occasions based on a configuration of a search space;
   generating a physical downlink control channel (PDCCH) in each of the plurality of monitoring occasions in the search space, wherein the PDCCHs are associated with the same downlink control information (DCI), and wherein the PDCCHs in the plurality of monitoring occasions are transmitted using the different beams;

transmitting, on a channel to a UE, an indication of a switch from a first beam to a second beam;

receiving an acknowledgement indicating that the channel is successfully decoded; and transmitting the PDCCHs, wherein the transmitting of the PDCCHs using the different beams is performed during a configured time window starting after the transmission of the acknowledgement.

14. The method of claim 13, wherein the PDCCHs comprise:
   a first PDCCH in a first monitoring occasion of the plurality of monitoring occasions; and
   a second PDCCH in a second monitoring occasion of the plurality of monitoring occasions, the second PDCCH being a repeated version of the first PDCCH.

15. The method of claim 13, wherein the PDCCHs comprise:
   a first PDCCH in a first monitoring occasion of the plurality of monitoring occasions; and
   a second PDCCH in a second monitoring occasion of the plurality of monitoring occasions, the second PDCCH being a different redundancy version of the first PDCCH.

16. The method of claim 13, further comprising transmitting, to a user equipment (UE), one or more other channels using one or more of the different beams used to monitor for the control channels.

17. The method of claim 13, further comprising transmitting, to a UE, a configuration of the different beams to be used to monitor the plurality of monitoring occasions.

18. The method of claim 13, further comprising selecting the different beams based on beams previously communicated between a UE and the BS.

19. The method of claim 18, wherein the different beams correspond to a subset of the beams previously communicated between the UE and the BS.

20. The method of claim 19, wherein the beams previously communicated between the UE and the BS comprise beams indicated in a layer-1 (L1) report.

21. The method of claim 13, further comprising transmitting signaling activating monitoring of the plurality of monitoring occasions using the different beams.

22. The method of claim 21, wherein the signaling comprises a medium access control (MAC)-control element (CE), UE-specific downlink control information (DCI), or group-common DCI.

23. The method of claim 13, wherein the beam switching occurs at an end of the configured time window during which the PDCCHs in the plurality of monitoring occasions are transmitted using the different beams.

24. The method of claim 13, wherein the plurality of monitoring occasions comprise:
   a first monitoring occasion associated with the first beam; and
   a second monitoring occasion associated with the second beam.

25. An apparatus for wireless communication by a user equipment (UE), comprising:
   a memory; and
   one or more processors coupled to the memory, the one or more processors being configured to:
      determine different beams to monitor a plurality of monitoring occasions based on a configuration of a search space;
      monitor for a physical downlink control channel (PDCCH) in each of the plurality of monitoring occasions in the search space, wherein the PDCCHs are associated with the same downlink control information (DCI), and wherein the plurality of monitoring occasions are monitored using the different beams;
      receive, on a channel from a BS, an indication of a switch from a first beam to a second beam;
      decode the PDCCHs after the monitoring; and
      transmit an acknowledgement indicating that the channel is successfully decoded, wherein the monitoring for the PDCCHs using the different beams is performed during a configured time window starting after the transmission of the acknowledgement.

26. The apparatus of claim 25, wherein the PDCCHs comprise:
   a first PDCCH in a first monitoring occasion of the plurality of monitoring occasions; and
   a second PDCCH in a second monitoring occasion of the plurality of monitoring occasions, the second PDCCH being a different redundancy version of the first PDCCH.

27. The apparatus of claim 25, wherein the one or more processors are further configured to receive, from a base station (BS), one or more channels using one or more of the different beams used to monitor for the PDCCHs.

28. An apparatus for wireless communication by a base station (BS), comprising:
   a memory; and
   one or more processors coupled to the memory, the one or more processors being configured to:
      determine different beams associated with a plurality of monitoring occasions based on a configuration of a search space;
      generate a physical downlink control channel (PDCCH) in each of the plurality of monitoring occasions in the search space, wherein the PDCCHs are associated with the same downlink control information (DCI), and wherein the PDCCHs in the plurality of monitoring occasions are transmitted using the different beams;
      transmit, on a channel to a UE, an indication of a switch from a first beam to a second beam;
      receive an acknowledgement indicating that the channel is successfully decoded; and
      transmit the PDCCHs, wherein the transmitting of the PDCCHs using the different beams is performed during a configured time window starting after the transmission of the acknowledgement.

* * * * *